Patented Mar. 10, 1942

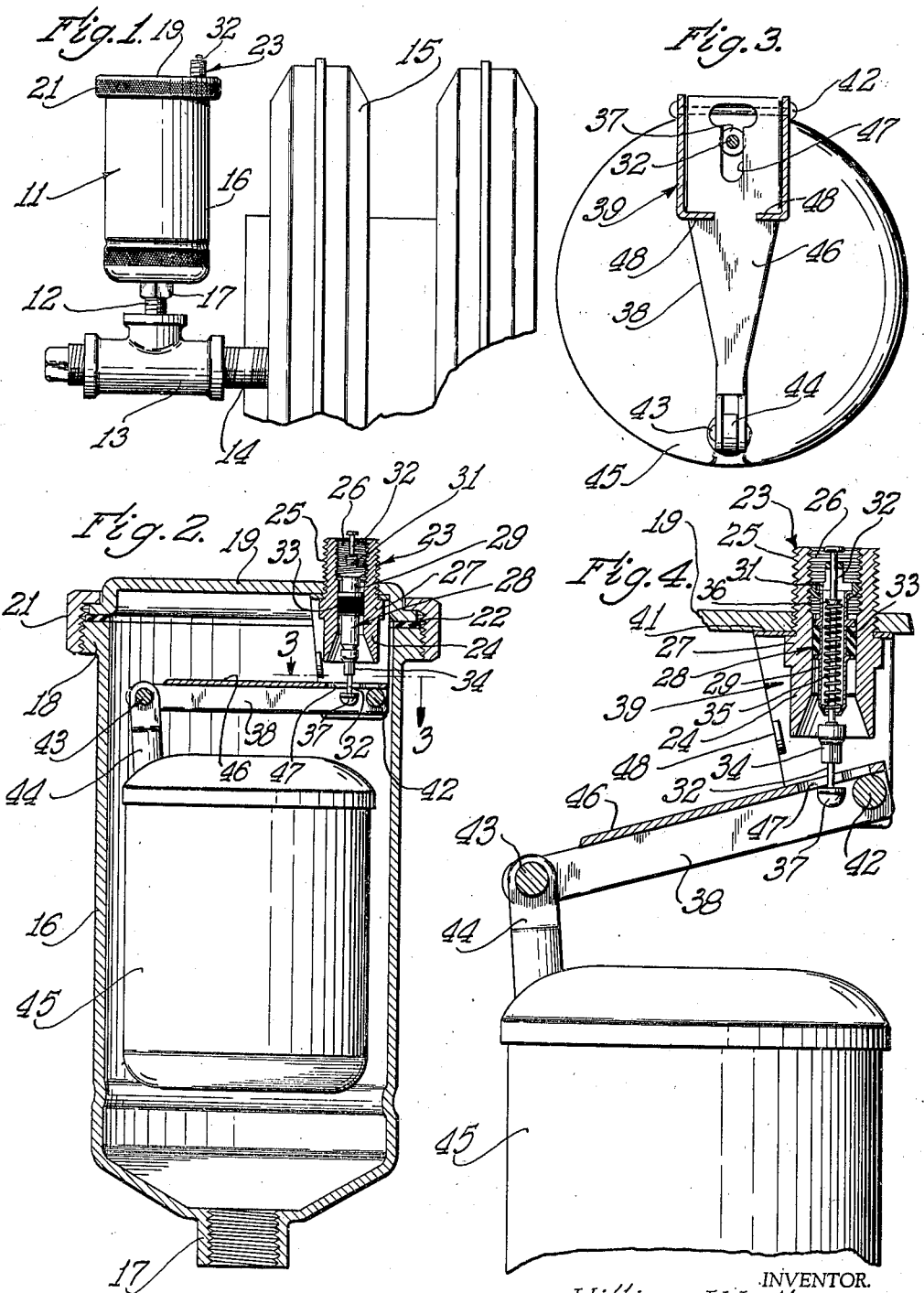

2,276,136

UNITED STATES PATENT OFFICE 2,276,136

AIR RELIEF DEVICE

William J. Woolley, Chicago, Ill.

Application July 7, 1939, Serial No. 283,156

3 Claims. (Cl. 137—122)

This invention relates in general to air relief devices, and more particularly to improvements in devices similar to that disclosed in my prior United States Letters Patent No. 2,106,512, issued January 25, 1938.

A principal object of the invention is the provision in a device for entrapping and automatically venting air from any desired type of liquid containing system of a valve mechanism which is readily adjustable from the exterior of the device to selectively vary the point at which it will be opened to vent the air in accordance with the amount of air entrapped therein.

Another important object of the invention is the provision in an automatic air relief device having a valve unit and a float for controlling the operation thereof of improved connections between the float and the valve unit which are more positive and accurate in operation than those heretofore provided and result in a more compact device which will take up a minimum amount of space.

A further important object of the invention is the provision of an automatic air relief device which is extremely simple in construction, is relatively cheap and easy to manufacture, and in which the working parts are very readily removable for the purpose of repair or replacement thereof.

Numerous other objects and advantages of the invention will be apparent as it is better understood from the following description, which, when taken in connection with the accompanying drawing, discloses a preferred embodiment thereof.

In the drawing,

Figure 1 is a side elevational view of part of the air relief device embodying the features of the invention;

Figure 2 is a longitudinal vertical section of the air relief device of Fig. 1;

Figure 3 is an enlarged horizontal section taken substantially on the line 3—3 of Fig. 2; and Figure 4 is an enlarged view similar to Fig. 2, with parts broken away, showing the valve mechanism in section and in open position.

Referring more particularly to the drawing, reference numeral 11 indicates in general an air relief device embodying the features of the instant invention which is shown in Fig. 1 as being connected by means of a suitable nipple 12 to a fitting 13 in turn connected by a nipple 14 to a radiator 15. Although a conventional type of hot water radiator is shown in the drawing, it will be readily appreciated that the relief device 11 is equally applicable for use in automatically venting any other desired type of system in which liquid is circulated either as a heating or cooling medium, such as in conjunction with air conditioning units, expansion tanks, or the like, or in relieving air or other gases from sludge lines, gasoline tanks, or any other liquid containing or transferring devices.

The air relief device 11 comprises a relatively small, substantially cylindrical casing 16 (Fig. 2) having a suitable inlet connection 17 at the lower end thereof and a threaded, circumferential flange 18 at its upper end. A bonnet or cover plate 19 is adapted to be removably secured to the upper end of the casing 16 by a threaded ferrule or union 21. A gasket 22 of any suitable material is preferably interposed between the cover plate 19 and the upper surface of the flange 18 on the casing 16.

A valve unit, indicated generally by reference numeral 23, is mounted in and extends through the cover plate 19 adjacent one edge thereof. The valve unit 23 comprises a hollow sleeve 24 threaded exteriorly and interiorly at 25 and 26, respectively, at its upper end. Intermediate its ends and adjacent the lower end of the outer threaded portion 25, the sleeve 24 is provided with a circumferential flange 27, for a purpose to be later more fully described. In addition to the sleeve 24, the valve unit 23 includes a self-closing valve member, indicated generally by reference numeral 28, which is adjustably mounted interiorly of the sleeve. The valve member 28 comprises a casing 29 having a hollow nut 31 rigidly secured to the upper end thereof in any suitable manner. The nut 31 is adapted to be screwed into the tapped portion 26 of the hollow sleeve 24, and is cut away on opposite sides at its upper end to provide a suitable guide for the upper end of a valve stem 32 extending through the casing 29 and nut 31 (Fig. 4). Intermediate its ends, the casing 29 is provided with a pair of vertically spaced, circumferential flanges between which a gasket or packing member 33 of any suitable material is held. The gasket 33 is of slightly larger diameter than the retaining flanges provided therefor on the casing 29, so that in any vertically adjusted position of the valve member 28 in the sleeve 24, the gasket or packing member 33 will insure a leak-proof connection between the valve member and the sleeve.

The lower end of the housing 29 is curved inwardly to provide a stationary valve seat, and a movable valve member 34 is rigidly mounted in any suitable manner upon the valve stem 32 directly adjacent the lower end of the casing 29. A coil spring 35 (Fig. 4) is mounted upon the valve stem 32 interiorly of the casing 29, with its lower end abutting against the lower, inturned end of the casing 29, and its upper end abutting against a collar or flange 36 provided upon the valve stem 32. The spring 35 thus functions to normally hold the valve member 34 in tight engagement with the lower end of the casing 29 to maintain the self-closing valve 28 in closed position, as shown in Fig. 2. In its open position of Fig. 4, the valve member 28 permits free flow of air through the hollow sleeve 24, such flow being through the casing 29 and the hollow nut 31.

The lower end of the valve stem 32 terminates in an enlarged portion 37 which is adapted to be engaged and pulled downwardly by a link or lever 38 to open the valve 28. A substantially U-shaped bracket 39 (Figs. 3 and 4) is rigidly secured to the cover plate 19 by the hollow sleeve 24, the central and horizontally disposed portion 41 of the bracket 39 being provided with a suitable aperture through which the upper end of the sleeve 24 extends, with the flange 27 of the sleeve holding the central portion 41 of the bracket against the under surface of the cover plate 19. The bracket 39 supports a pivot pin 42 which extends through suitable apertures therein adjacent the lower, outer corners of the leg portions thereof. One end of the link 38 is pivotally supported by the pin 42, and the other end of the link is pivotally secured by a pin 43 to the upper end of a rod 44. The lower end of the rod 44 is rigidly secured in any suitable manner to a hollow float 45 which is disposed interiorly of, and is slightly smaller in diameter than, the main casing 16 of the air relief device 11. As shown in Figs. 3 and 4, the link 38 is channel-shaped, with the side portions thereof engaging the pins 42, 43. The top or central portion 46 of the link 38 is provided adjacent its outer end with a T-shaped slot or recesses 47 through which the valve stem 32 extends. The width of that portion of the slot 47 extending longitudinally of the link 38 is less than the diameter of the enlarged end portion 37 of the valve stem 32, while the transverse portion of the slot 47 permits passage of the enlarged end portion 37 therethrough. The side or leg portions of the bracket 39 are provided with lugs 48 disposed adjacent the lower end of the sleeve 24 and extending inwardly above the central portion 46 of the link 38. The lugs 48 thus function to limit upward movement of the link 38 and the float 45.

In the assembly of the above described device, the bracket 39 is first secured to the cover plate 19 by screwing the sleeve 24 into the tapped aperture provided in the latter. The valve member 28 is then mounted interiorly of the sleeve 24 by screwing the nut 31 into the tapped portion 26 of the sleeve. The link 38 is moved toward the unit 23 so that the transverse portion of the slot 47 is in alignment with the valve stem 32, thereby permitting the enlaregd head portion 37 of the latter to be disposed below the central portion 46 of the link. The link 38 is then mounted upon the pivot pins 42 and 43. All working parts are thus mounted in proper relationship to each other upon the cover plate 19, and the assembly of the air relief device 11 is completed by securing the plate 19 to the casing 16 by means of the union 21.

When mounted as shown in Fig. 1, or in operative relation with any desired liquid containing system, the liquid in the system will enter the connection 17 of the casing 16 to raise the float 45 to its inoperative position of Fig. 2. Any air or other gases entrained in the system to which the device 11 is connected will be collected in the upper end of the casing 16. As the amount of air collected in the casing 16 increases, the liquid level therein will fall. In response to the decrease in liquid level, the float will move downwardly to move the link 38 from its inoperative position of Fig. 2 to its operative position of Fig. 4. Such movement of the link 38 will result in the central portion 46 thereof contacting the enlarged head portion 37 of the valve stem 32 to move the member 34 out of engagement with the lower end of the casing 29 to open the valve 28. The interior of the casing 16 will thus be opened to the atmosphere to permit out-flow of the air collected therein. As the entrapped air is vented from the casing 16, the water level therein will again rise to bring the float 45 to its inoperative position of Fig. 2. As the float 45 is raised, the link 38 is moved out of engagement with the enlarged head portion 37 of the valve stem 32 to permit the spring 35 to close the valve 28.

It will thus be seen that the valve 28 functions positively and accurately to relieve any air entrapped within the casing 16 as soon as the float 45 reaches that level in its downward movement which is effective to result in the central portion 46 of the link 38 contacting the enlarged head portion 37 of the valve stem 32. This effective level or point at which the float 45 becomes active to open the valve 28 may be varied as desired by vertical adjustment of the valve in the sleeve 24. Such adjustment of the valve 28 is effected by rotation of the hollow nut 31 relative to the sleeve 24. Due to the provision of the gasket or packing member 33, a leak-proof connection between the valve 28 and the sleeve 24 is provided in all operative positions of the former.

The above described air relief device 11 is extremely simple in construction, is relatively cheap to manufacture, and the working parts thereof are readily removable for the purpose of repair or replacement. The outstanding advantage of the device lies in the ready adjustability of the valve 28 from the exterior thereof. In addition, because of its compact structure and extremely small size, the air relief device 11 is particularly adaptable for use with any desired type of water containing system. In any installation wherein the venting of the air through the casing 29 to the atmosphere is liable to damage or otherwise affect adjacent walls, furnishings, or the like, a suitable discharge conduit may be readily attached thereto, the outer threaded portion 25 of the sleeve 24 enabling such connection to be made directly to the valve unit 23.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. An automatic air relief device, comprising a relatively small casing, a float disposed interiorly of said casing, a normally substantially horizontal link pivotally mounted at one end interiorly of said casing and pivotally connected at the other end to said float, and a vertically disposed removable valve unit having an adjustable valve member mounted in and extending through the top wall of said casing including a valve stem extending through an aperture in said link and having an enlarged end portion adapted to be engaged by said link to open the interior of the casing to the atmosphere upon downward movement of said float.

2. An automatic air relief device, comprising a relatively small cylindrical casing having means at its lower end for connection to a water containing system, a valve unit mounted in and extending through the top wall of said casing, including a hollow sleeve, and a valve member adjustably mounted therein having a stem extending into the interior of said casing with an enlarged head portion at its lower end, a float disposed interiorly of said casing for vertical movement in response to changes in liquid level therein, and a link pivotally mounted at one end interiorly of said casing and pivotally connected at the other end to said float, said link being so constructed and arranged as to engage said enlarged head portion to open said casing to the atmosphere upon downward movement of said float past a predetermined point, and said predetermined point being selectively variable by adjustment of said valve member.

3. An automatic air relief device, comprising a relatively small cylindrical casing having means at its lower end for connection to a liquid containing system, a cover plate removably secured by a union to the upper end of said casing, a valve unit mounted in and extending through said cover plate, including a hollow sleeve, and a valve member adjustably mounted therein having a stem extending into the interior of said casing with an enlarged head portion at its lower end, a float disposed interiorly of said casing for vertical movement in response to changes in liquid level therein, and a link pivotally mounted at one end interiorly of said casing and pivotally connected at the other end to said float, said link being so constructed and arranged as to engage said enlarged head portion to open said casing to the atmosphere upon downward movement of said float past a predetermined point, and said predetermined point being selectively variable by adjustment of said valve member.

WILLIAM J. WOOLLEY.